(12) United States Patent
Reincke

(10) Patent No.: US 6,874,307 B2
(45) Date of Patent: Apr. 5, 2005

(54) DEVICE FOR MAINTAINING GRASS FIELDS

(76) Inventor: Marinus Reincke, Rijksstraatweg 16, Leersum (NL), NL-3956

(*) Notice: Subject to any disclaimer, the term of this patent is extended or adjusted under 35 U.S.C. 154(b) by 0 days.

(21) Appl. No.: 10/312,924

(22) PCT Filed: Jun. 28, 2001

(86) PCT No.: PCT/NL01/00487

§ 371 (c)(1),
(2), (4) Date: Dec. 27, 2002

(87) PCT Pub. No.: WO02/01937

PCT Pub. Date: Jan. 10, 2002

(65) Prior Publication Data

US 2004/0020179 A1 Feb. 5, 2004

(30) Foreign Application Priority Data

Jul. 5, 2000 (NL) .............................. 1015621

(51) Int. Cl.⁷ .................. A01D 34/03; A01D 34/36; A01D 34/43; A01D 34/57; A01D 34/64
(52) U.S. Cl. .......................... 56/15.5; 56/16.7
(58) Field of Search ................. 56/15.5, 15.2, 56/16.4 R, DIG. 9, DIG. 22, 16.7

(56) References Cited

U.S. PATENT DOCUMENTS

| | | |
|---|---|---|
| 2,509,993 A | 5/1950 | Soss |
| 2,860,718 A | 11/1958 | Webster |
| 3,154,903 A * | 11/1964 | Smith .................. 56/15.8 |
| 3,177,639 A * | 4/1965 | Hardee ................. 56/15.3 |
| 3,267,654 A | 8/1966 | Hanson |
| 3,657,866 A * | 4/1972 | Burroughs ............ 56/15.5 |
| 3,736,735 A * | 6/1973 | Kulak et al. .......... 56/13.6 |
| 4,195,860 A * | 4/1980 | Helams ................ 172/451 |
| 4,320,616 A * | 3/1982 | Marto .................. 56/15.3 |
| 4,621,699 A * | 11/1986 | Slazas ................. 180/53.7 |
| 4,840,020 A * | 6/1989 | Oka .................... 56/15.2 |
| 4,926,621 A * | 5/1990 | Torras ................. 56/6 |
| 5,022,219 A * | 6/1991 | Knurr et al. ......... 56/16.4 R |
| 5,140,804 A * | 8/1992 | Gleeson .............. 56/13.6 |
| 5,765,348 A * | 6/1998 | Thagard et al. ...... 56/15.2 |
| 6,481,194 B1 * | 11/2002 | Brewer et al. ....... 56/17.2 |

FOREIGN PATENT DOCUMENTS

| | | |
|---|---|---|
| DE | 2016512 | 10/1971 |
| DE | 2017981 | 10/1971 |
| DE | 2405025 | 8/1975 |
| FR | 991839 | 10/1951 |
| FR | 1378078 | 2/1965 |
| GB | 2326580 | 12/1998 |

* cited by examiner

Primary Examiner—Árpád F+e Kovács
(74) Attorney, Agent, or Firm—Muserlian, Lucas and Mercanti

(57) ABSTRACT

The invention relates to a device for maintaining grass fields, provided with a frame (1) movable along a ground surface, supporting on one or more support wheels (2), a gearbox with power take-offs (5), a steering handle (11), a drive motor (10), and with exchangeable working attachments which can be fixedly connected to the device and another support wheel (7) on one side adjacently of this working attachment which can be connected fixedly, pivotally or for active steering to the frame with a supporting arm (8) which is adjustable in position and lockable.

11 Claims, 3 Drawing Sheets

DEVICE FOR MAINTAINING GRASS FIELDS

This application is a 371 of PCT/NL01/00487 filed Jun. 28, 2001.

The invention relates to a device for maintaining grass fields, further referred to as lawns, wherein, as seen in the direction of travel, no support wheels which first rest on the surface for working are placed in the projected working surface for an exchangeable working attachment which can be fixedly coupled to the frame.

A lawn requires many diverse maintenance operations. In addition to mowing in the horizontal plane, mowing in the vertical plane, cutting edges, adding fertilizer, removing leaves and so on can be envisaged here.

Maintenance machines are known for all these operations. It is sometimes possible to perform a plurality of operations with one basic device, because these devices have exchangeable attachments.

For an optimal level working it is of great importance that the device, particularly the working attachment, is held at a fixed, stable, adjustable height above the surface for working. The position of the support wheels is essential herein. These support wheels serve to hold the device in balance and support it such that the working takes place optimally even in the case of uneven lawns. Known machines therefore usually have a plurality of support wheels. An optimal support is obtained by three support wheels, although more support wheels are often added so as to enable better following of an uneven surface. It is often unavoidable herein that one or more support wheels are positioned in the projected working surface in front of the working attachment. This has great drawbacks, for instance when grass is mown in the horizontal plane. This is because the grass in front of the working attachment is first flattened by a support wheel, whereafter the mowing attachment can no longer mow this strip. After a time this strip will recover, thereby resulting in an unevenly mown, irregular grass field.

Devices are also known with a support wheel on both sides adjacently of the working attachment. These support wheels then lie adjacently of the projected working surface in front of the working attachment. The grass is then not flattened directly, but indirectly. If a support wheel is positioned adjacently of the working attachment on both sides of the working attachment, one of the two will then always rest on the as yet unworked lawn. Nor is it then possible to work close to lawn edges or obstacles, since a support wheel supports adjacently of the working attachment.

The present invention has for its object to provide an improved support for the support wheels, wherein the above stated drawbacks are obviated.

The invention provides for this purpose a device according to claim 1. A support wheel is herein preferably connected to the frame with a supporting arm on one side adjacently of the fixedly mountable working attachment, wherein the position is determined such that the whole device, including a fixedly connected exchangeable working attachment, does not tilt.

The support wheel adjacently of the working attachment can be fixedly or pivotally connected to the supporting arm. If it is connected pivotally, the whole device can be passively steered by exerting a lateral force on the steering handle of the device, whereby the support wheel will pivot.

An improved steering is obtained if the support wheel adjacently of the working attachment is made actively steerable. The support wheel pivotable in the horizontal plane can be connected for this purpose to the likewise pivotable steering handle by means of a rod system. By now pivoting the steering handle the support wheel adjacently of the working attachment will pivot to the same degree. The device can hereby be actively steered during working of the lawn and transport, without the character of the support being changed.

The support wheel adjacently of the working attachment is connected to the frame by means of a supporting arm. If this supporting arm is mounted on the frame for rotation in the vertical plane, the position of the frame relative to the supporting arm can be changed using a length-adjustable guide arm. If the position of the frame changes, the distance of the mounted working attachment relative to the support surface will also change.

By herein mounting a catch on the frame with a hook-in element on the supporting arm, the frame can be fixedly connected in raised position to the supporting arm. This is a great advantage if it is desired to lock the frame with working attachment in transport position. The working attachment is hereby held clear of the underlying support surface on which the support wheels rest.

Since the device has only one support wheel adjacently of the exchangeable attachment, the exchangeable working attachment can protrude outside the frame on the opposite side of the support wheel. Obstacles such as support wheels and the like are after all not situated there.

Because the space in front of the frame and adjacently of the support wheel adjoining the surface for working is further free of any obstacles, diverse working attachments can be mounted. These working attachments are centred by means of dowel pins. If working attachments have to be driven, they can be connected to the power take-offs, which can be coupled.

The present invention will be further elucidated on the basis of the non-limitative embodiment shown in the following figures. Herein:

Figure 1:
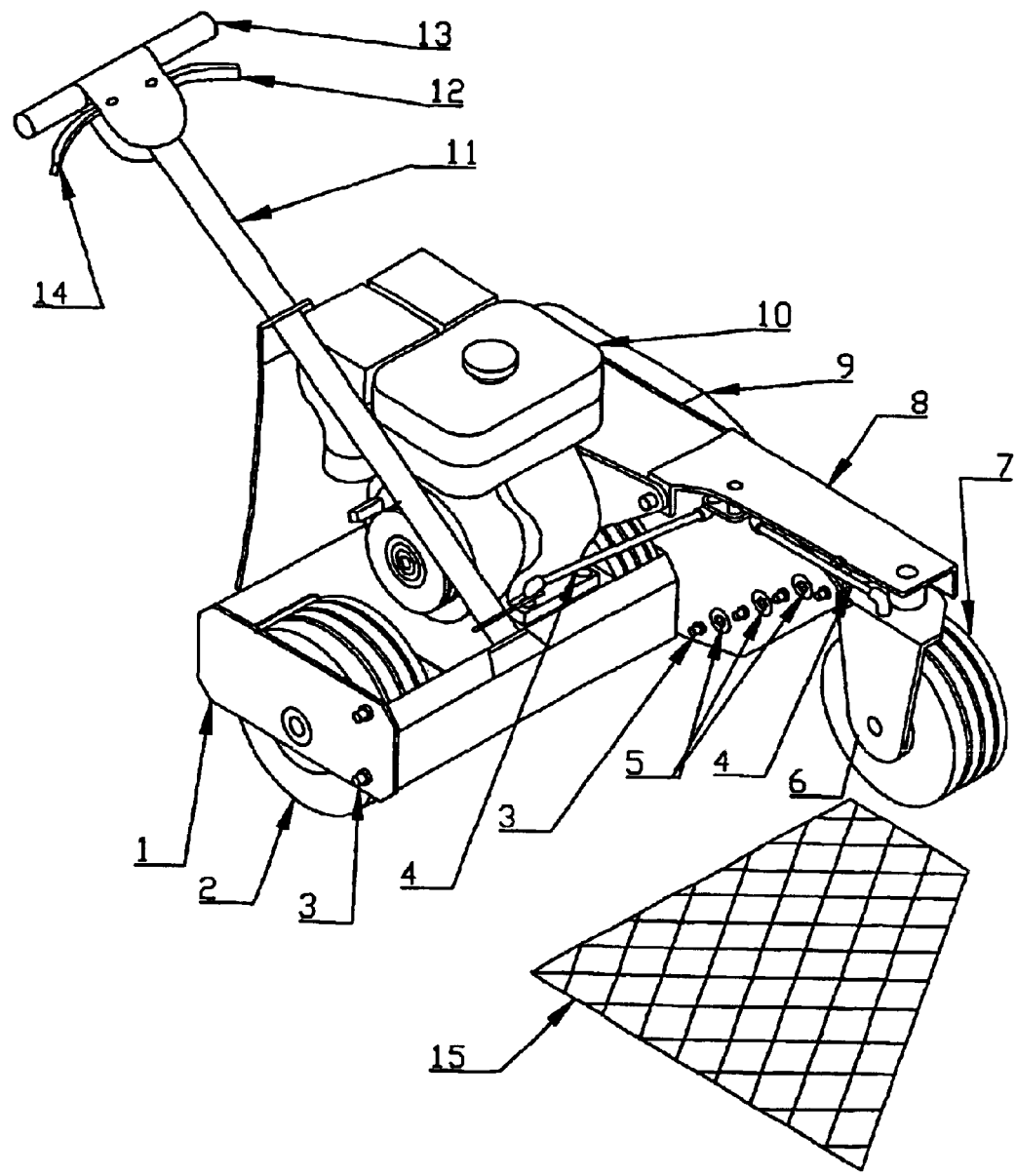
FIG. 1 shows a perspective view of the device without a mounted working attachment.

FIG. 1 shows a maintenance machine for lawns, comprising a frame 1 under which are mounted support wheels 2. These support wheels can be driven from gearbox 9. This drive can be coupled by means of control lever 14. A subsequent support wheel 7 is situated adjacently of the projected working surface 15. Support wheel 7 is connected to supporting arm 8 by means of a pivotable arm 6. Steering handle 11 is connected pivotally on its longitudinal axis to frame 1. Via rod system 4 the support wheel 7 is actively steered by steering handle 11. A number of power take-offs 5 are arranged in gearbox 9. These power take-offs can be coupled to drive motor 10 by means of control lever 12. Centring pins 3 are further arranged so that exchangeable working attachments can be mounted quickly and, if necessary, driven by means of one of the power take-offs 5.

Figure 2:
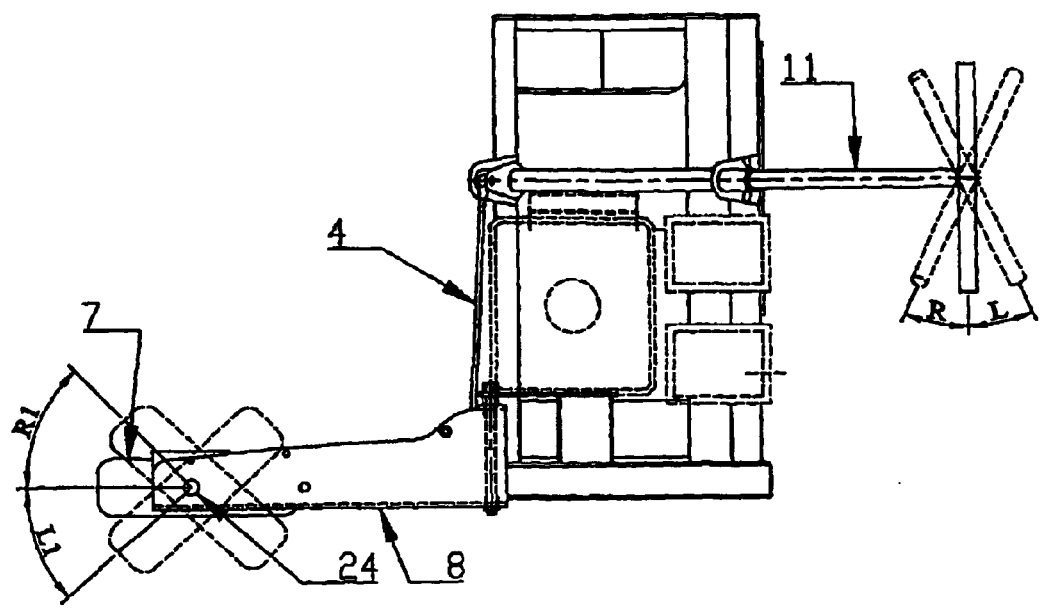
FIG. 2 shows a top view of the device, once again without a working attachment.

FIG. 2 further shows that support wheel 7 can be actively steered by steering handle 11. If the steering handle is pivoted through an angle R, support wheel 7 will pivot through an angle R1 via rod system 4. Pivoting of the steering handle through an angle L produces a deflection of L1 of support wheel 7.

Figure 3:
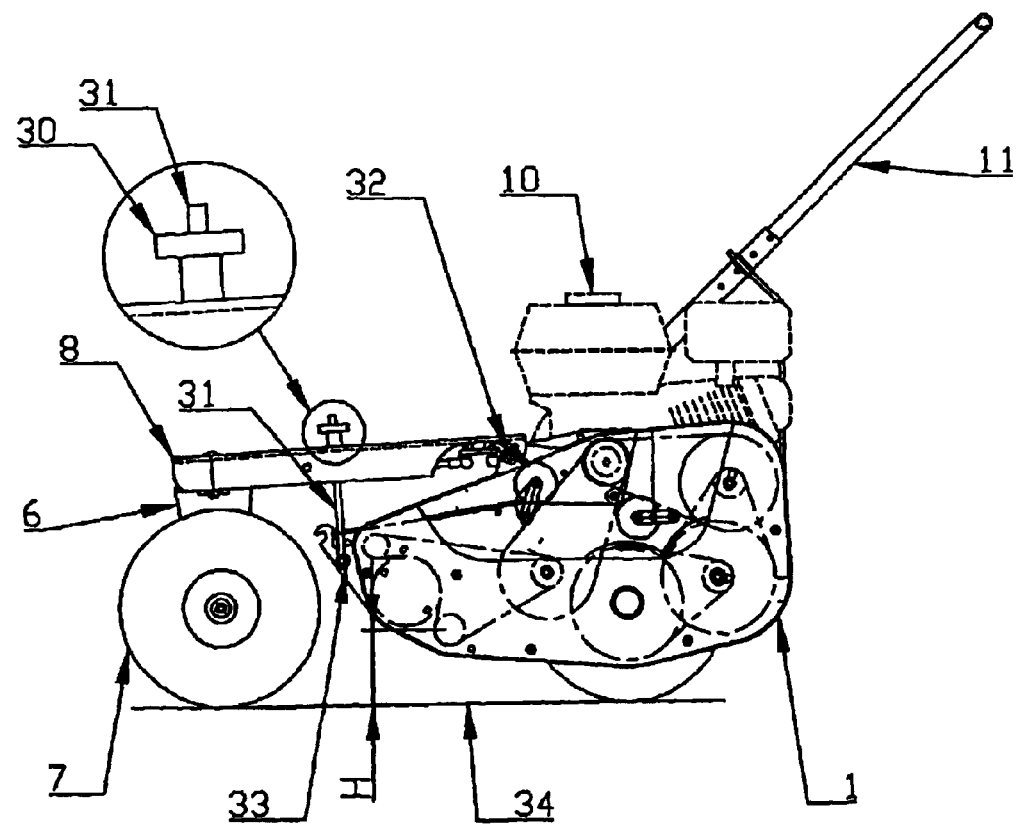
FIG. 3 is a side view on the side of the adjacent support wheel next to the working attachment.

FIG. 3 shows a side view of support wheel 7, mounted on supporting arm 8 via a pivot arm 6. This supporting arm is further mounted on frame 1 for pivoting in the vertical plane by means of a pin 32. A length-adjustable guide arm 31 is then arranged which allows frame 1 to support on the supporting arm via point 33, by means of adjusting knob 30. By now altering the length of the guide arm by means of 30, distance H will change. The distance H has a direct relation to the distance above the support surface 34 of a working attachment for mounting.

Figure 4:
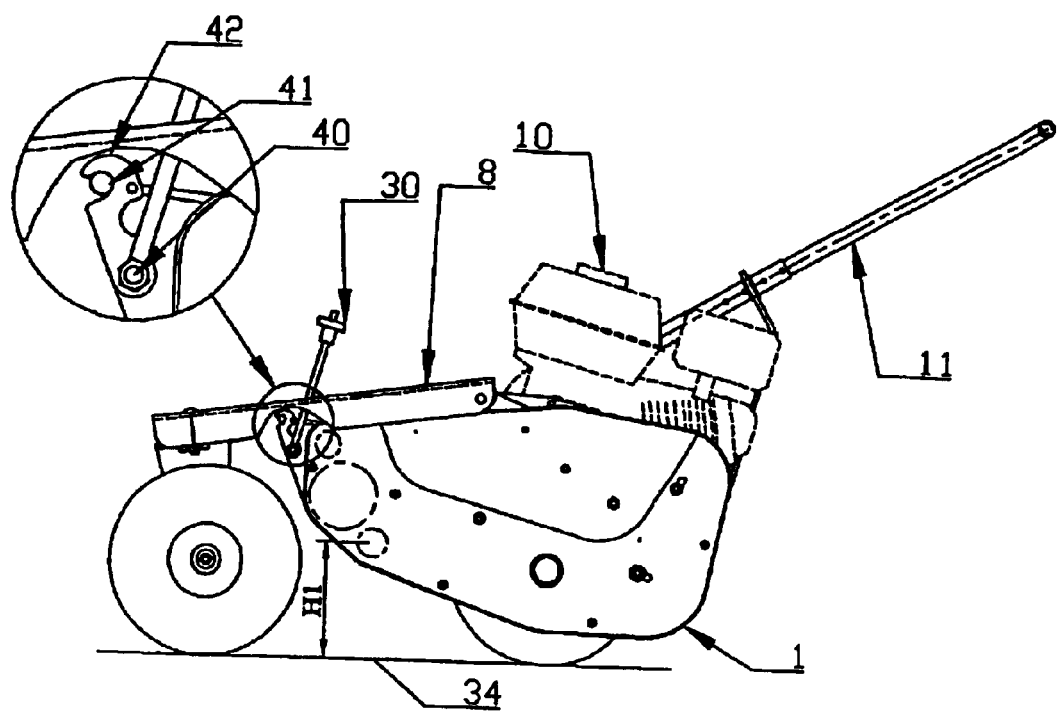
FIG. 4 is a side view as in FIG. 3, but now with the device locked in transport position.

In FIG. 4 is shown that the supporting arm can be locked in sport position using catch 42 and hook-in element 41. Catch 42 is operated by a control lever (not further shown) on the steering handle. The distance H1 is essentially greater than H in FIG. 3. The working attachment is now therefore held well above support surface 34, whereby transport can take place in simple manner. The geometry of rod assembly 4 is designed such that steering by means of steering handle 11, as shown in FIG. 2, is also possible in the transport position of FIG. 4.

Figure 5:
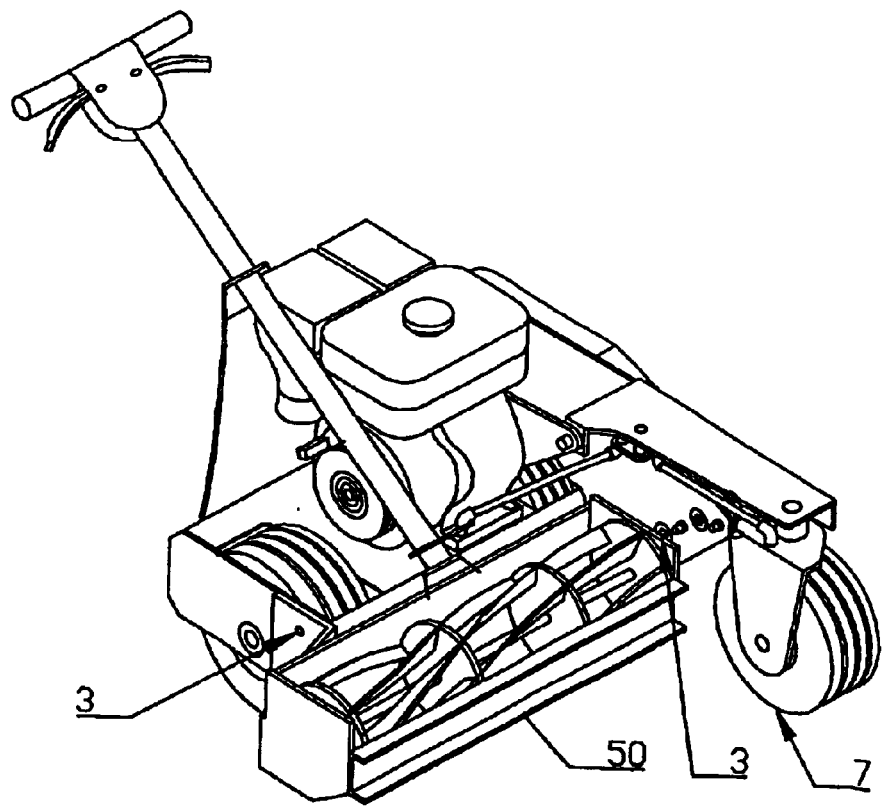
FIG. 5 shows a perspective view as in FIG. 1, but now provided with a fixedly mounted exchangeable working attachment.

FIG. 5 finally shows how a possible working attachment can be fixedly connected to the device in front of the frame and adjacently of support wheel 7 by means of the dowel pins 3, which are not all visible, and the locking which is not further shown. The driven working attachment 50 is a mowing device for mowing grass in the horizontal plane.

What is claimed is:

1. A device for maintaining grass lawns, comprising:
   a frame movable along a ground surface,
   a frame support wheel on either side under this frame,
   a gearbox protruding forward as seen in the travel direction, said gearbox including a plurality of power take-offs,
   a steering handle connected to the frame,
   a drive motor on the same side as the gearbox,
   an exchangeable working attachment fixedly mountable on the front part of the frame as seen in the travel direction, said attachment connectable to at least one of said power take-offs,
   a support wheel on the side adjacent of the working attachment, wherein the support wheel is connected by a supporting arm to the frame on one side adjacently of the exchangeable working attachment such that the working device, including the working attachment, does not tilt.

2. A lawn maintaining device of claim 1, wherein the support wheel adjacently of the working attachment is pivotally connected to the supporting arm.

3. A lawn maintaining device of claim 1 wherein the support wheel adjacent to the working attachment is actively steerable.

4. A lawn maintaining device of claim 1, wherein the support wheel can be actively steered by the steering handle.

5. A lawn maintaining device of claim 1 wherein the supporting arm is connected to the frame for pivoting in the vertical plane.

6. A lawn maintaining device of claim 5, wherein the supporting arm rotatable in the vertical plane is connected to the frame with a length-adjustable guide arm, whereby the position of the supporting arm can be changed.

7. A lawn maintaining device of claim 5, wherein the frame can be fixedly connected to the supporting arm in raised position to lock the device with the working attachment in transport position.

8. A lawn maintaining device of claim 1, wherein the space in front of the frame as seen in the travel direction, and opposite the support wheel placed adjacently of the exchangeable working attachment for mounting, is free of any obstacles of the frame.

9. A lawn maintaining device of claim 1, wherein the exchangeable working attachment can protrude outside the frame on the opposite side of the support wheel connected to the supporting arm.

10. A lawn maintaining device of claim 1, wherein different working attachments can be connected to the gearbox by means of dowel pins and a locking device.

11. A lawn maintaining device of claim 1, wherein the individually mountable working attachements are drivable by means of at least one power take-off.

* * * * *